United States Patent
Prill (10) Patent No.: US 10,752,268 B2
(45) Date of Patent: Aug. 25, 2020

(54) DEVICE FOR DATA AND/OR SIGNAL TRANSMISSION

(71) Applicant: Voith Patent GmbH, Heidenheim (DE)

(72) Inventor: Thomas Prill, Gehrden (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/091,664

(22) PCT Filed: Mar. 16, 2017

(86) PCT No.: PCT/EP2017/056203
§ 371 (c)(1),
(2) Date: Oct. 5, 2018

(87) PCT Pub. No.: WO2017/182200
PCT Pub. Date: Oct. 26, 2017

(65) Prior Publication Data
US 2019/0152500 A1    May 23, 2019

(30) Foreign Application Priority Data

Apr. 19, 2016 (DE) .......................... 10 2016 107 211

(51) Int. Cl.
*B61L 15/00* (2006.01)
*B61G 1/00* (2006.01)
(Continued)

(52) U.S. Cl.
CPC ............ *B61L 15/0018* (2013.01); *B61G 1/00* (2013.01); *B61L 15/02* (2013.01); *H04B 10/502* (2013.01);
(Continued)

(58) Field of Classification Search
CPC .. B61L 15/0018; B61L 15/02; B61L 2205/00; B61L 2207/02; B61L 15/0027;
(Continued)

(56) References Cited

U.S. PATENT DOCUMENTS 4,120,471 A * 10/1978 Auer, Jr. ................ B61L 29/286
246/128
4,172,576 A * 10/1979 Svet, Jr. ................ B61L 29/286
246/125
(Continued)

FOREIGN PATENT DOCUMENTS

CA    3009600 A1 *  6/2017 .............. F21V 7/043
DE    19625960         1/1998
(Continued)

OTHER PUBLICATIONS

Office Action dated Nov. 5, 2019 for JP Application No. 2018-553088, 6 pages.
(Continued)

*Primary Examiner* — Abbas H Alagheband
(74) *Attorney, Agent, or Firm* — Cesari and McKenna, LLP (57) ABSTRACT

The invention relates a device (10) for data and/or signal transmission between two adjacent units of a multi-membered, track-guided vehicle combination, wherein the device (10) comprises at least one emitter (11) for emitting electromagnetic radiation as needed. According to the invention, the at least one emitter (11) is integrated into a lamp module (1) which is designed to be installed in a front region of a vehicle (A, B) of the multi-membered vehicle combination.

18 Claims, 3 Drawing Sheets

(51) Int. Cl.
*H04W 4/40* (2018.01)
*B61L 15/02* (2006.01)
*H04B 10/50* (2013.01)
*G01S 17/08* (2006.01)
*G01S 17/32* (2020.01)

(52) U.S. Cl.
CPC ........... *H04W 4/40* (2018.02); *B61L 2205/00* (2013.01); *B61L 2207/02* (2013.01); *G01S 17/08* (2013.01); *G01S 17/32* (2013.01); *H04B 10/50* (2013.01)

(58) Field of Classification Search
CPC ......... H04W 4/40; H04B 10/502; H04B 7/00; H04B 10/00; H04B 10/04; H04B 10/50; H04L 12/40189; H04L 69/40; H04L 2012/40293; B61C 17/12; G01S 1/70; G01S 17/08; G01S 17/32; G08B 1/08; G08B 21/00; G08B 1/16
USPC ........................................................ 398/115
See application file for complete search history.

(56) References Cited

U.S. PATENT DOCUMENTS

| | | | |
|---|---|---|---|
| 6,897,771 B1 | 5/2005 | Lodhie et al. | |
| 7,075,427 B1* | 7/2006 | Pace | B61L 23/06 246/125 |
| 7,391,978 B2* | 6/2008 | Kikushima | H04B 10/54 359/278 |
| 7,518,149 B2* | 4/2009 | Maaskant | H01L 31/035281 257/79 |
| 7,548,172 B2* | 6/2009 | Shinada | B60Q 1/50 340/555 |
| 8,103,167 B2* | 1/2012 | Tidhar | H04B 10/1143 398/130 |
| 8,902,076 B2* | 12/2014 | Pederson | G07C 9/00158 340/815.45 |
| 9,383,752 B2* | 7/2016 | Mian | G05D 1/0229 |
| 9,609,569 B2* | 3/2017 | Byers | H04W 36/32 |
| 9,628,188 B2* | 4/2017 | Handelman | H04J 14/02 |
| 10,131,365 B2* | 11/2018 | Kim | B60W 50/14 |
| 2006/0098448 A1* | 5/2006 | Coast | B60Q 1/04 362/517 |
| 2008/0218323 A1* | 9/2008 | Lesesky | G07C 5/008 340/431 |
| 2008/0310850 A1* | 12/2008 | Pederson | G08B 13/19645 398/135 |
| 2010/0029209 A1* | 2/2010 | Daum | B61L 15/0027 455/59 |
| 2014/0067188 A1* | 3/2014 | Mian | G05D 1/0229 701/28 |
| 2014/0129061 A1* | 5/2014 | Cooper | B61L 15/0036 701/19 |
| 2015/0043919 A1 | 2/2015 | Handelman | |
| 2015/0088373 A1* | 3/2015 | Wilkins | G05D 1/0234 701/36 |
| 2016/0105218 A1* | 4/2016 | Henry | H04B 5/0018 455/523 |
| 2016/0146938 A1* | 5/2016 | Becker | G01S 17/32 250/208.2 |
| 2016/0259028 A1* | 9/2016 | High | G05D 1/0011 |
| 2016/0291154 A1* | 10/2016 | Nehmadi | G01S 17/08 |

FOREIGN PATENT DOCUMENTS

| | | | |
|---|---|---|---|
| DE | 19915935 | 10/2000 | |
| DE | 19926085 A1 | 12/2000 | |
| DE | 102004037849 A1 | 7/2005 | |
| DE | 202007008825 | 10/2007 | |
| DE | 10 2006 0282888 A1 | 12/2007 | |
| DE | 19904110 | 8/2008 | |
| DE | 102007030590 | 8/2008 | |
| DE | 102009033980 | 1/2011 | |
| DE | 102010045742 A1 | 3/2012 | |
| DE | 102011001549 A1 * | 7/2012 | ............ B61L 15/02 |
| EP | 1 455 207 A1 | 9/2001 | |
| EP | 1 231 724 A1 | 8/2002 | |
| EP | 0982215 B1 | 10/2004 | |
| EP | 1515292 | 3/2005 | |
| JP | S59-006704 | 1/1984 | |
| JP | 60174540 | 9/1985 | |
| JP | H03-094739 | 4/1991 | |
| JP | H05-046054 | 2/1993 | |
| JP | H08-332953 | 12/1996 | |
| JP | 2002-111582 | 4/2002 | |
| JP | 2003505732 | 2/2003 | |
| JP | 2009-290359 | 12/2009 | |
| KR | 101500449 | 3/2015 | |
| WO | 2015/057417 | 4/2015 | |

OTHER PUBLICATIONS

Office Action dated Oct. 9, 2019 for CN Application No. 201780022580.6, 10 pages.

* cited by examiner

DEVICE FOR DATA AND/OR SIGNAL TRANSMISSION

CROSS REFERENCE TO RELATED APPLICATIONS

This application is the National Stage of International Application No. PCT/EP2017/056203, filed on Mar. 16, 2017, which claims priority to German Application No. 10 2016 107 211.7, filed on Apr. 19, 2016. The contents of both applications are hereby incorporated by reference in their entirety.

The present invention relates to a device for data and/or signal transmission between two adjacent units of a multi-membered, track-guided vehicle combination.

Data and/or signal transmission between two adjacent mechanically coupled units of a track-guided vehicle combination, in particular a rail vehicle combination, currently takes place largely via electrical contacts partnered with the mechanical coupling.

For example, an electrical contact coupling for automatic central buffer couplings is known from printed publication EP 0 982 215 B1 which is provided with a mechanical central buffer coupling on which an electrical cable coupling is held so as to be longitudinally displaceable. The cable coupling comprises at least one connection line-connected plug connection arranged at the coupling point of separation for each of the railway vehicles to be coupled. In order to avoid a redundant contact arrangement arranged symmetrically to the vertical central longitudinal plane of the coupling rod and to provide an overall simpler and lighter design to the cable coupling, the cable coupling according to this prior art further comprises a longitudinally displaceable adapter box which is disposed between the respective plug connections of the coupled rail vehicles in the coupled state and on only one of the respective plug connections in the uncoupled state. This adapter box contains the necessary electrical connecting lines for connecting the connection lines of the railway vehicles to be coupled.

Furthermore known for example from the DE 199 26 085 A1 printed publication is an electrical contact coupling for automatic central or central buffer couplings which has a contact support fixed to the coupling head and guided in longitudinally displaceable manner in the longitudinal direction of the central buffer coupling with contacts for electrical connections. In order to achieve the most optimal protection possible for the contacts for the electrical connections, this prior art likewise known from the field of rail vehicle technology provides for the contact support to be displaceable from a rearward uncoupled position into a forward coupling-ready position, wherein the contact support is covered by a protective flap in the rearward position and is exposed in the forward position by a pivoting of the protective flap.

A fundamental problem with such known systems for transmitting signals, in particular discrete control signals and data signals, is the high mechanical load on the electrical contacts employed, particularly during the coupling process. As a result of the usually automated coupling operations, although also as a result of vibrations and abrasion during operation as well as a result of environmental influences, conventional signal transmission systems usually used in couplings end up experiencing gradual contact damage. Above all, the contact terminals are subject to a high degree of wear and corrosion. This has the consequence, inter alia, of increasing the electrical resistance of the electrical contacts during signal transmission, which can impair the quality of the signals to be transmitted and in extreme cases can even lead to the complete failure of the signal connection.

Therefore, to be able to ensure proper signal transmission in conventional signal transmission systems, regular maintenance and inspection of the contacts provided in the electrical coupling is necessary. Particularly necessary is the regular cleaning and replacing of the electrical contact terminals used in the electrical or mechanical coupling.

One possibility for avoiding these problems associated with the conventional transmission of discrete control signals and data signals might be reducing, to the greatest extent possible, the multitude of single-signal contact terminals as frequently used for example in electrical contact couplings, which can be done for instance by bundling multiple single-signal contact terminals or by using the well-known multiplex method.

While such a solution can reduce the total amount of wiring needed for an individual electrical contact such that the electrical contact coupling can also be of correspondingly smaller configuration if need be, it is unable to eliminate the fundamental problem associated with the high mechanical load on the electrical contacts as occurs during the coupling process. Here, too, the electrical contacts utilized are subject to strong mechanical stress and wear, particularly during the coupling process.

Furthermore known from the DE 10 2004 037 849 A1 printed publication is a train coupling device having a first train coupling and a second train coupling which are each connected to the respective railcar body of the rail vehicle by means of a railcar mount. A contactless transmission system for transmitting audio signals, video signals, operational data, commands and/or other bus data is provided between the first rail vehicle and the second rail vehicle. The transmission system specifically consists of a first HF-component, a second HF-component, a first transmitter/receiver and a second transmitter/receiver. The HF-components are fixed to or in the train coupling, preferentially on the coupling point side. The antenna elements provided in this known prior art signal transmission device are each in the form of a patch antenna and in particular realized as surface-mountable miniature ceramic antennas.

The disadvantage to this contactless solution known from the prior art is particularly its only low quality of data transmission. In particular, a patch antenna, as proposed in the conventional solution, is only of limited suitability for contactless data transmission in an automatic central buffer coupling as the overall attenuation of the signal transmission system is relatively high. This makes it imperative to select a correspondingly high transmission level for the respective patch antenna. Due to the disadvantageous directional characteristic of the patch antenna, however, a relatively high transmission level results in high individual antenna element noise emissions.

A further disadvantage associated with this known prior art contactless solution for data and/or signal transmission is that the patch antenna in the proposed patch antenna configuration also exhibits insufficiently developed resistance to interference; i.e. the radiation characteristic of external spurious radiation. In practical use, sometimes only unreliable and failure-prone data transmission is possible with this type of signal transmission system.

The same or at least similar problems analogously befall the high-frequency coupling elements proposed in printed publication DE 10 2010 045 742 A1.

Following from the disadvantages and problems associated with conventional signal transmission systems for track-guided vehicles as addressed, the present invention is based on the task of specifying a device for data and/or signal transmission between two adjacent units of a multi-membered, track-guided vehicle combination which ensures reliable and in particular interference-resistant data and/or signal transmission.

This task is solved according to the invention by the subject matter of independent claims 1 and 8, whereby advantageous further developments are set forth in the respective dependent claims.

Accordingly, in particular proposed is for the inventive device for data and/or signal transmission to comprise at least one emitter for emitting electromagnetic radiation as needed, whereby this at least one emitter is integrated into a lamp module designed to be installed in a front region of a vehicle of the multi-membered vehicle combination.

Alternatively or additionally thereto, the task underlying the invention is solved by a device for data and/or signal transmission, whereby the device comprises at least one receiver for receiving electromagnetic radiation emitted by means of an emitter associated with the receiver and for converting the received electromagnetic radiation into a data signal, wherein the at least one receiver is integrated into a lamp module designed to be installed in a front region of a vehicle of the multi-membered vehicle combination.

The term "lamp module" as used herein is in principle to be understood as a component which is implemented and designed to be incorporated into the front region, in particular in a front nose, of a track-guided vehicle such as, for example, a rail vehicle. Particularly included among lamp modules in this context—depending on the nature and type of the vehicle—are headlights/main beam lights and marker lights such as signal lights, tail lights, brake lights, turn indicators and the like. Also further included under the term "lamp module" are exterior light combinations (e.g. signal light and tail light, main beam light and signal light, main beam light and signal light and tail light).

A lamp module is in this context to particularly be understood as an optical and electrical unit comprising a connection device and at least one lamp or light module respectively. A lamp module is preferably further equipped with at least one optic means (lens, objective, aperture, filter, etc.).

The lamp or the light module is basically of any type; a lamp module preferably comprises one or more light-emitting diodes (LEDs). However, halogen lamps, xenon lamps and/or other lamps can also be used.

The connection device preferably associated with the lamp module serves in the electrical connection and/or mechanical fixing and/or thermal coupling to a support device. The connection device is to this end preferably configured in the form of one or more connectors or contact elements respectively.

The support device serves in particular the mechanical connecting of the lamp module to the front region, particularly in the front nose of the track-guided vehicle. To that end, the support device preferably comprises a plurality of receivers or mating connectors respectively matched to a correspondingly complementary constructed connector and in which a lamp module or its connection devices respectively can in each case be accommodated.

Several technical requirements for a lamp module of the type considered herein such as for instance the luminous intensity, the chromaticity coordinate, the illumination area, etc., are regulated in the relevant standards (see e.g. UIC 532, UIC 534—status on: date of filing).

Apart from these prescribed requirements, vehicle manufacturers have certain latitude particularly in terms of the design of the lamp module but also with respect to the arrangement and design of the light modules contained in the lamp module.

This latitude in particular allows the lamp module to be allocated the data and/or signal transmission function additionally to its primary function as a headlight/main beam light or marker light (signal light or tail light), and that by at least one emitter being integrated into the lamp module for the as-needed emitting of data and/or signals in the form of electromagnetic radiation (and that in addition to the at least one light module along with any given optics there may already be integrated into the lamp module).

Alternatively or additionally thereto, at least one receiver of the data and/or signal transmission device is also integrated into the lamp module, whereby this at least one receiver serves in receiving the electromagnetic radiation emitted by means of an emitter associated with the receiver and converting the received electromagnetic radiation into a data signal.

Integrating the components necessary for optical data and/or signal transmission, e.g. in particular the emitter and receiver, into the lamp module of the track-guided vehicle provides a number of different advantages.

Since an optical transmission device is used for the data and/or signal transmission, there is no need for highly specialized data connections as need to be utilized with conventional electrical contact couplings. The mechanical and electrical couplings can thus be implemented more economically, more robustly and more maintenance-friendly.

Moreover, a lamp module used as an exterior light in a track-guided vehicle is usually a component which is already in place on a track-guided vehicle and frequently also already protected against external weather conditions. Consequently, integrating the optical data and/or signal transmission or respectively a relocating of the optical data and/or signal transmission into a lamp module of the track-guided vehicle represents a cost-effective solution.

In conjunction thereto, it is in particular to be noted that lamp modules employed at the present time frequently already have heating devices and/or automatic cleaning devices in order to prevent snow/ice build-up or dirtying of the lamp module even in adverse weather conditions. By relocating the optical data and/or signal transmission into a lamp module of the track-guided vehicle, the optical data and/or signal transmission device also remains unaffected by adverse weather conditions.

The advantageous optical coupling ratios in coupled vehicle units is noted as a further advantage since the distance between two facing lamp modules; i.e. the distance between the tail light of a preceding, leading vehicle to the headlight of the following, led vehicle, is relatively small. Any potential contamination problems can be easily controlled by intensity, focusing and redundancy concepts (i.e. multi-part lamp modules).

Lastly noted as a further advantage are the more favorable properties with regard to electromagnetic compatibility, particularly resistance to interference relative outdoor radio/wireless solutions or rail radio/radio-based train control systems.

Additional advantages of the inventive optical data and/or signal transmission result from the advantageous further developments of the inventive optical data and/or signal transmission device indicated in the dependent claims.

The term of "data and/or signal transmission" as used herein is in particular to be understood as the optical or respectively contactless transmission of audio signals, video signals, operational data, commands and/or other bus data. The term "optical" is hereby not restrictively limited to the wavelength range of approximately 400 nm to approximately 780 nm (visible light) perceptible to the human eye. In fact, the optical data and/or signal transmission in particular relates to longer wavelength electromagnetic radiation, especially near-infrared (NIR—0.78 to 3.0 μm), short-wave infrared (SWIR—1.4 to 3 μm) or even long-wave or far infrared and on through to infrared radiation.

In this context, it is thus particularly advantageous for the at least one emitter of the data and/or signal transmission device to comprise a laser and/or light-emitting diode array with at least one laser and/or light-emitting diode integrated into the lamp module of the vehicle. Utilizing such a laser and/or light-emitting diode as an optical emitter of the data and/or signal transmission device considerably extends the maintenance interval of the data and/or signal transmission device—compared to conventional contact-based data and/or signal transmission devices—such that downtimes for the track-guided vehicle due to required maintenance work on the data and/or signal transmission device are decreased.

In conjunction thereto, it is particularly advantageous for a light module of the lamp module such as, for example, a main beam headlight and/or a signal light of the lamp module, to itself/themselves be formed by a light-emitting diode array. Such a lamp module would have the advantage of being characterized by the reduced maintenance.

A further realization of the inventive optical data and/or signal transmission device provides for the device to comprise at least one of the electro-optical signal converters associated with the at least one emitter for converting a data signal into a corresponding electromagnetic signal to be sent by the at least one emitter. Conceivable in this context is in particular additionally providing a multiplexer unit associated with the at least one emitter to that end in order to multiplex multiple signals to be sent by the at least one emitter. It is thus possible to make use of well-known multi-channel/multiplex methods for the data and/or signal transmission such that several data streams can even be transmitted if needed by virtue of the high optical channel widths with the optical data and/or signal transmission device.

Further of advantage is for the optical data and/or signal transmission device to not only comprise at least one emitter but in addition also at least one receiver, whereby the receiver is designed to receive an electromagnetic signal and convert it into a corresponding electrical data signal.

In conjunction thereto, it is advantageous for the at least one receiver of the optical data and/or signal transmission device to be associated with a respective demultiplexer unit in order to allow the separating of the multiplexed signals received by the at least one receiver as an electromagnetic signal.

The present invention is not, however, limited to embodiments in which the optical data and/or signal transmission device strictly comprises at least one emitter (and, as applicable, at least one receiver additionally thereto). Rather, according to a further aspect of the present invention, an optical data and/or signal transmission device is specified, whereby the device primarily only comprises at least one receiver designed to receive electromagnetic radiation emitted by means of an emitter associated with the receiver and convert the received electromagnetic radiation into a data signal. According to the invention, this embodiment provides for the at least one receiver to be integrated into a lamp module designed to be installed in a front region of a vehicle of a multi-membered vehicle combination.

According to preferential embodiments, the receiver employed in the inventive data and/or signal transmission device comprises a photodiode array with at least one photodiode which is preferably integrated into an LED array of a light module (signal light, tail light and/or main beam light) of the lamp module. Alternatively or additionally thereto, the receiver can also be realized as a PIN photodiode. This embodiment is in particular suitable for high data rates.

According to preferential embodiments, the at least one receiver of the optical data and/or signal transmission device comprises at least one correspondingly allocated electro-optical signal converter which is designed to convert an electromagnetic signal received by the at least one receiver into a corresponding data signal. In conjunction hereto, it is conceivable for the electro-optical signal converter to comprise a signal/data interface via which the electro-optical signal converter can be connected to an (in-vehicle) data bus.

In one preferential realization of the inventive data and/or signal transmission device, the device comprises at least one emitter as well as at least one receiver, whereby these components are part of a distance control system designed to conclude, on the basis of the electromagnetic radiation received by the at least one receiver, a distance to an object close to the at least one emitter.

Different optical methods can come under consideration for the distance measurement. One conceivable method is light triangulation. In this process, a point of light, particularly a laser dot, is projected onto the adjacently arranged object by the at least one emitter of the optical data and/or signal transmission device and then reproduced with optics (lens) on a receiver of the optical data and/or signal transmission device. In this embodiment, the receiver is preferably realized as a PIN-photodiode array or potentially also as a CCD/PSD sensor. The point of incident on the receiver then indicates the distance of the object.

Alternatively to light triangulation, interferometry is cited as a method of distance measurement. In this method, the distance to an object disposed adjacent to the emitter is concluded on the basis of the travel time of the radiation emitted by said at least one emitter of the optical data and/or signal transmission device.

Intensity modulation is cited as a further distance measurement method.

Accordingly to be stated is that an additional advantage of the data transmission device in the lamp module is yielded by a feasible distance detection of two coupled vehicles, which can in particular be used to monitor the integrity of the vehicle combination for the purpose of detecting train detachment and train separation.

The invention is not just limited to an optical data and/or signal transmission device of the type described but in particular also relates to a lamp module for installation in a front region of a track-guided vehicle, wherein the lamp module comprises at least one main beam headlight and/or at least one signal light, and wherein the lamp module comprises at least one optical data and/or signal transmission device of the previously described type.

So that the lamp module requires less maintenance, one advantageous further development provides for the main beam headlight and/or the signal light of the lamp module to be in each case formed by an LED array. This for example enables dispensing with the typical halogen lamps. In comparison thereto, LED arrays have longer maintenance intervals so downtimes for the track-guided vehicle due to required maintenance work can be decreased.

Preferentially, the main beam headlight as well as the signal light are in each case also designed as LED arrays, whereby these two LED arrays of the main beam headlight and the signal light are preferably arranged at a distance behind or next to each other, whereby the main beam headlight is preferably behind the signal light. This measure achieves a particularly advantageous integration of the lamp module into the front nose or the front region respectively, particularly in the case of a high-speed train, wherein the illumination requirements for the track-guided vehicle (here: rail vehicle) are additionally met.

To optimize the luminance, it is further advantageous for the LED array of the signal light to be inwardly curved.

The lamp module advantageously has a cover plate able to be removed from the outside. This enables easy replacement of the LED arrays or other components of the lamp module if required during maintenance.

The following will reference the accompanying drawings in describing exemplary embodiments of the inventive solution in greater detail.

Shown are.

Figure 1:
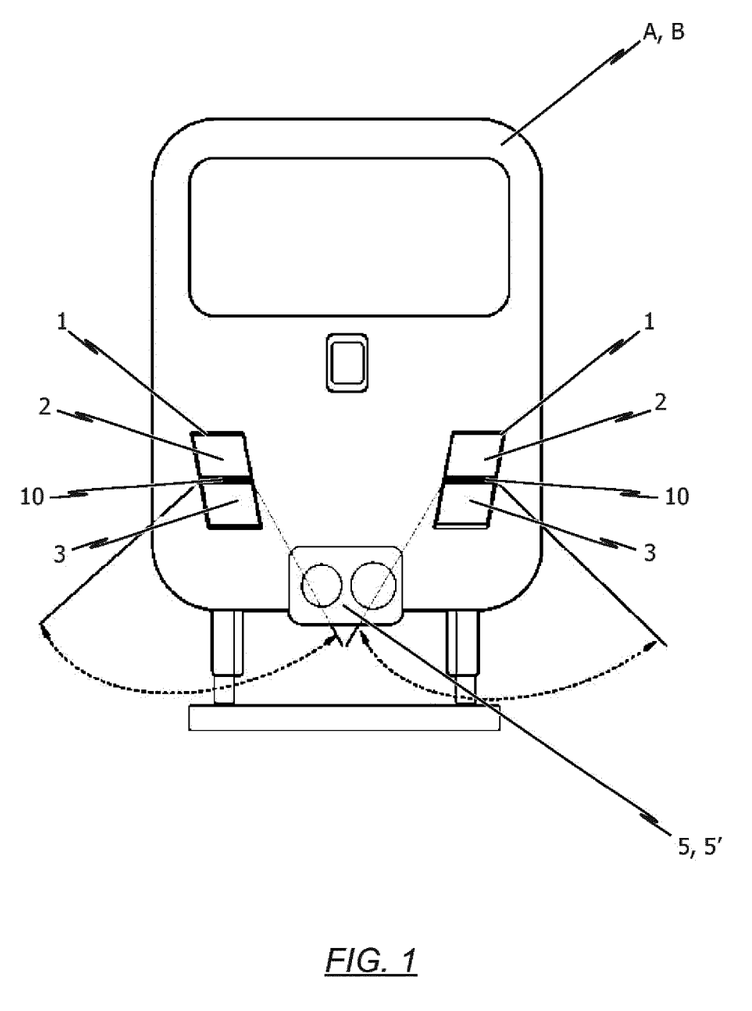
FIG. 1 a frontal view of the front region of a track-guided vehicle, wherein both sides of the front region are equipped with a lamp module.

Both sides of the frontal region of a track-guided vehicle, in particular railway vehicle, as depicted schematically in FIG. 1 show a respective lamp module 1 which will be described further in the following referencing the depiction provided in FIG. 2. The lamp module 1 comprises a lower light module 3 for a main beam headlight as well as an upper light module 2 for a signal light.

The two light modules 2, 3 of the respective lamp module 1 are preferably of substantially uniform design. Meaning that they are of substantially the same size, the same form, have an equally dimensioned and formed illumination area, the same angle of radiation and the like. This uniformity to the light modules 2, 3 can preferably also apply solely within subgroups of the light modules 2, 3; in other words, there can be one, two or more types/subtypes/forms of light modules 2, 3 in the structure of one light module 1.

Each of the light modules 2, 3, in particular the light modules of one subgroup, preferably further have the same chromaticity coordinate and/or the same angle of radiation as lamp module 1 is to have. FIG. 1 accordingly indicates the resulting angle of radiation or illumination respectively for the lamp modules 1.

The embodiment depicted in FIG. 1 makes use of a combined exterior lamp consisting of a main beam headlight (lower light module 3) and a signal light or respectively marker light (upper light module 2) as lamp module 1. It is however of course also conceivable to make use of just one single light module able to be accordingly switched between two modes of operation for the lamp module 1.

The light modules 2, 3 can preferably furthermore be operated in (at least) two modes of operation, for example undimmed and dimmed. This for example enables the main beam headlight (lower light module 3) and the signal light (upper light module 2) to each also be operated as a low-beam light at reduced light intensity.

Figure 2:
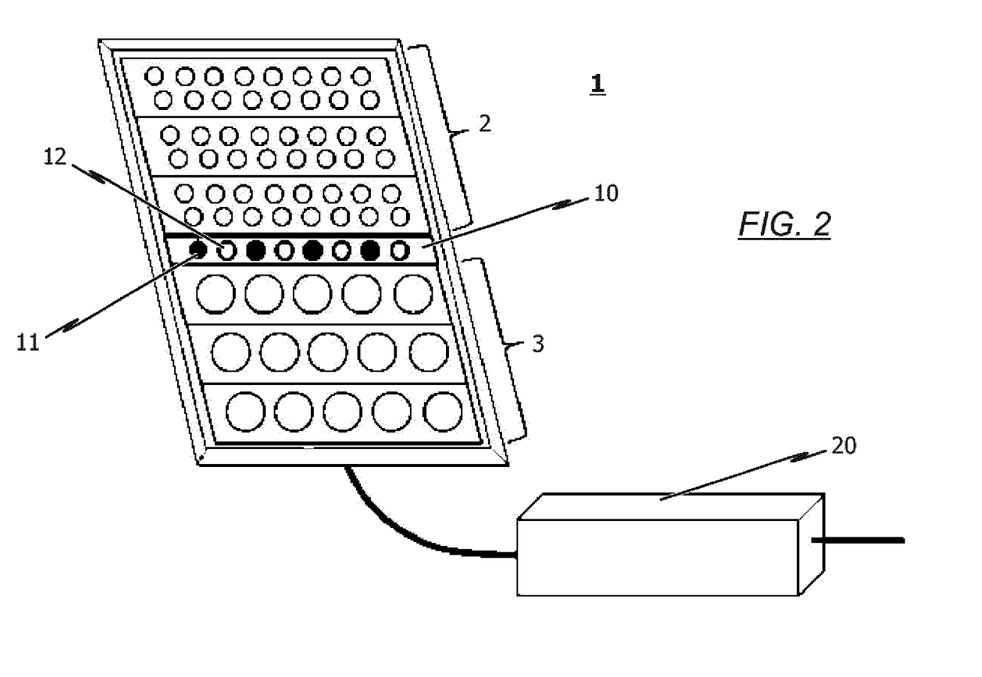
FIG. 2 a schematic detailed view of a lamp module which can be utilized in the front region of the track-guided vehicle as per FIG. 1.

It is apparent from the detailed depiction in FIG. 2 that the lamp module 1 used in the frontal region of the track-guided vehicle according to FIG. 1 comprises respective light modules 2, 3 realized as LED arrays, in particular an upper LED array for the signal light and a lower LED array for the main beam headlight.

Further to be seen from the FIG. 2 depiction is that the LED arrays of signal light and main beam headlight are arranged at a distance next to or above each other, whereby when viewed from the front, the signal light LED array is arranged above the main beam headlight LED array.

An optical data and/or signal transmission device 10 is provided in the area between the LED array for the signal light and the LED array for the main beam headlight in the exemplary embodiments depicted in the drawings. This consists of a plurality of emitters 11 for the as-needed emitting of electromagnetic radiation as well as a plurality of receivers 12 designed to receive the electromagnetic radiation emitted by an emitter 11. The emitters 11 and receivers 12 in the embodiment depicted for example in FIG. 2 are disposed in alternating arrangement with one another. Other arrangements are however of course also possible.

The lamp module 1 schematically depicted in FIG. 2 further comprises a control device 20 in order to applicably control the respective LED arrays of the lamp module 1.

Preferably, the control system associated with the optical data and/or signal transmission device 10 is also accommodated in the control device 20 of the lamp module 1. This in particular includes an electro-optical signal converter associated with the emitters 11 of the optical data and/or signal transmission device 10, an electro-optical signal converter associated with the receivers 12 of the optical data and/or signal transmission device 10, a multiplexer unit associated with the emitters 11 of the optical data and/or signal transmission device 10 and/or a demultiplexer unit associated with the receivers 12 of the optical data and/or signal transmission device 10.

The respective emitters 11 of the optical data and/or signal transmission device 10 are preferably implemented as laser diodes and/or LEDs, in particular infrared LEDs. Preferably, the emitters 11 operate in the non-visible frequency range so as to prevent any interference with the conventional vehicle lights/conventional lamp module 1.

The respective receivers 12 of the optical data and/or signal transmission device 10 are thereby photodiodes/PIN photodiodes, their sensitivity adapted to the frequency range of the emitters 11 of the optical data and/or signal transmission device 10.

Figure 3:
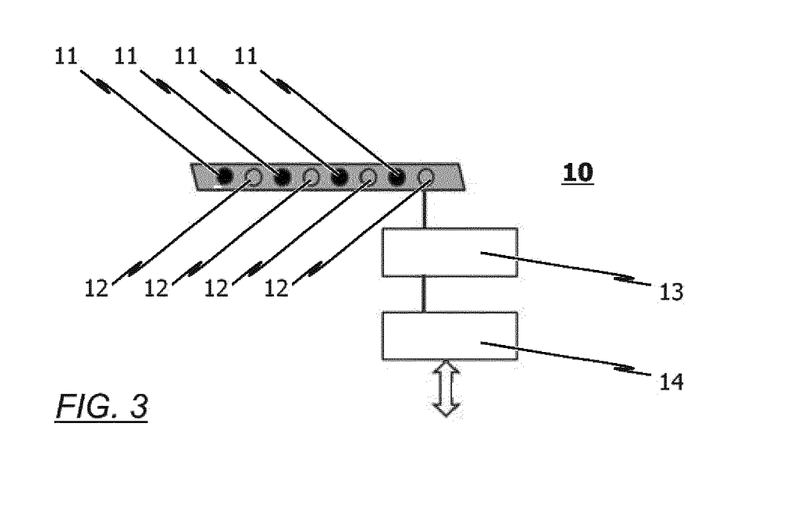
FIG. 3 a schematic view of an exemplary embodiment of an optical data and/or signal transmission device integrated into the lamp module according to FIG. 2.

As can be seen from the FIG. 3 depiction, the optical data and/or signal transmission device 10 (=optical transceiver unit) depicted schematically therein comprises an LED array for data transmission as emitter 11, a photodiode array for receiving data as receiver 12, and a converter unit 13 for the back and forth conversion of a standardized data signal into a corresponding high-frequency light signal.

A data interface unit 14 connects the optical data and/or signal transmission device 10 to a standardized data bus connection. This optical data and/or signal transmission device 10 already enables full data transmission within a definable distance between two adjacent units of a multi-membered vehicle combination.

Integrating a distance control for controlling the integration of the two coupled vehicle units/vehicle components in the optical data and/or signal transmission device 10 is also conceivable and would create additional benefit.

A wired Ethernet gigabit link (e.g. 1000 BASE-T, IEEE802.2, clause 40) is for example employed as the data bus connection.

Power is preferably supplied to the optical data and/or signal transmission device 10 by PoE (Power-over-Ethernet) via the data bus connection itself. The process can optionally also be of optical fiber-connected or radio-based ("wireless") design. A coupling to other digital data transmission media can thereby then take place directly.

As stated above, the LED array forming the receiver 12 of the optical data and/or signal transmission device 10 advantageously consists of infrared lamps so as not to negatively impact the (visible) spectrum produced by the vehicle's headlight and tail light since characteristic values such as the luminous intensity and chromaticity coordinate for vehicle lights are usually subject to standardized requirements.

One preferential embodiment for the LED array consists of utilizing laser diodes (coherent light sources) in place of LEDs since doing so can achieve high radiation intensity and good directivity. Laser diodes of laser class 1 are advantageously utilized for this implementation in order to ensure the highest possible safety of the operating personnel. Data transmission with laser diodes ensues via luminous intensity modulation at a specific operating point (BIAS-T) within a converter unit 13.

As indicated in FIG. 1, the lamp modules 1, in which the inventive optical data and/or signal transmission device 10 is integrated, are respectively arranged on the direction of travel's right and left. The angles of illumination of the lamp modules 1 are selected such that there is always a sufficient optical coupling between the emitters 11 and the receivers 12 for reliable data transmission, particularly in curves (cornering).

The specific arrangement of the lamp modules 1 additionally provides for redundancy with respect to the data transmission since the transmission devices (emitter 11 and receiver 12) of the optical data and/or signal transmission device 10 are doubled. The train-side convergence of both data signals into one physical channel can advantageously ensue by means of a suitable Ethernet switch (e.g. RST ("Rapid Spanning Tree") Protocol).

Figure 4:
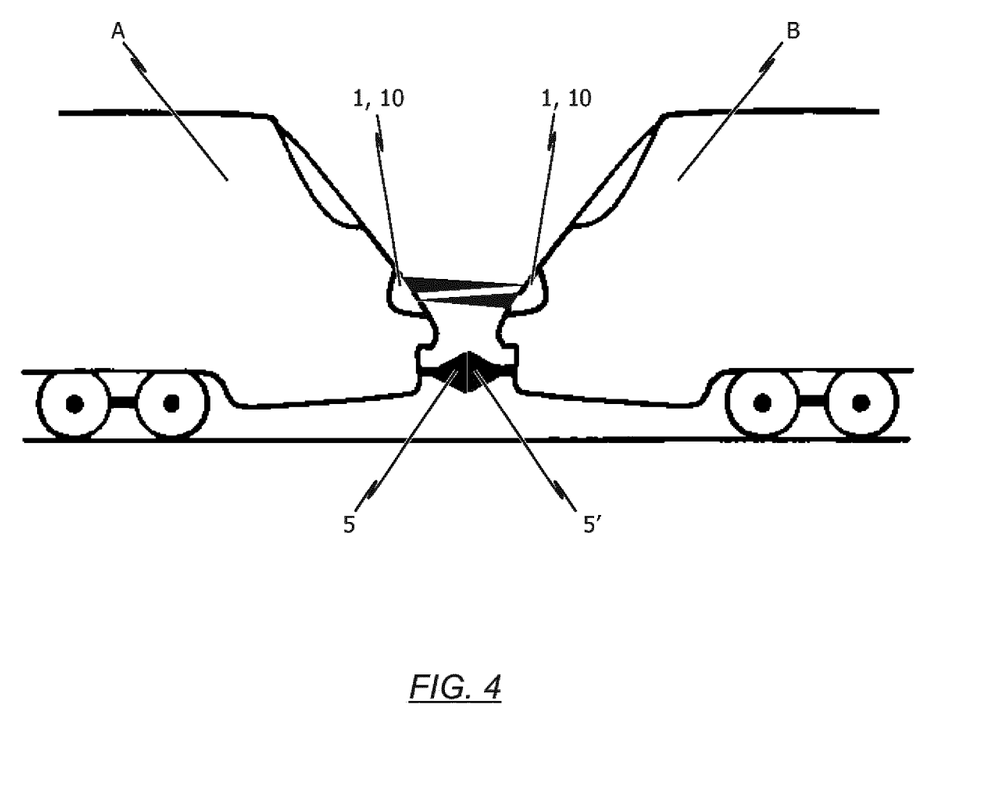
FIG. 4 a schematic view of an optical data and/or signal transmission between two adjacent units of a multi-membered, track-guided vehicle combination.

FIG. 4 depicts two trainsets A, B of a multi-membered vehicle combination mechanically coupled together by respective central buffer couplings 5, 5', wherein the right (leading) trainset A exchanges data via its lamp module 1 (here: tail light) with the left (led) vehicle B by way of the lamp module 1 (here: headlight) associated with said vehicle B. The data communication thereby runs bidirectionally (dual channel) via the optical signals.

The advantages achievable with the inventive solution are again summarized below as follows:

Elimination of highly specialized data connections in the electrical train coupling, with the electrical train couplings thereby being able to be realized more economically, more robustly and more maintenance-friendly.

Cost-effective relocating of the data transmission to the existing train lighting protected against external weather as provided on every rail vehicle.

If applicable, even being able to transmit different data streams as bundles in multi-channel/multiplex processes due to the very high optical channel bandwidths.

Advantageous optical coupling ratios for coupled train units as the distance from tail light (preceding, leading vehicle) to headlight (following, led vehicle) is relatively small; contamination problems can thereby be controlled by intensity, focusing and redundancy concepts (i.e. multi-part train lighting).

LED train lighting usually comprises heating devices which prevent snow and ice build-up on the lamps. The optical coupling thereby remains unaffected even during adverse weather conditions.

More favorable electromagnetic compatibility properties, particularly resistance to inference relative outdoor radio/wireless solutions or rail radio/radio-based train control systems.

An additional benefit of the data transmission device in the train lighting results from feasible distance detection (in particular Doppler effect) of both train components so as to monitor the integrity of the vehicle combination for the purpose of detecting train detachment and train separation.

The lamp modules 1 utilized during the data and/or signal transmission in accordance with FIG. 4 are realized as an exterior light assembly and in this exemplary embodiment comprise two exterior lights: a main beam headlight as the first exterior light and a marker light (e.g. white signal light or red tail light) as the second exterior light. The two exterior lights are arranged in a lamp housing behind a lamp cover which is of at least partially transparent design and preferably detachably affixed. It is of course also possible for the first exterior light to be designed as a marker light and the second exterior light as a headlight or an exterior light assembly to only be provided with one exterior light (headlight or marker light).

The beam angle of the main beam headlight is, if possible, not limited in the downward direction by walls or the like. This allows the main beam headlight to produce a suitable cone of light in compliance with the regulations allowing for the special conditions in the area of the front nose of the track-guided vehicle.

The light modules 2, 3 of the exterior lighting are powered by the on-board voltage of the track-guided vehicle.

The invention is not limited to the embodiments depicted in the drawings but rather yields from an integrated consideration of all the features disclosed herein.

The invention claimed is:

1. A device for data or signal transmission between two adjacent units of a multi-membered track-guided vehicle combination, the device comprising:
    at least one emitter configured to emit electromagnetic radiation, wherein the at least one emitter is integrated into a lamp module configured to be installed in a front region of a vehicle of the multi-membered track-guided vehicle combination;
    at least one receiver configured to receive and covert an electromagnetic signal into a corresponding electrical data signal;
        wherein the at least one receiver is configured to receive at least a portion of the electromagnetic radiation emitted by the at least one emitter, wherein a distance to an object adjacent to the at least one emitter is determined based on the at least the portion of the electromagnetic radiation received by the at least one receiver, and wherein the object is closer to the at least one emitter than to the at least one receiver.

2. The device according to claim 1, wherein the at least one emitter includes a laser emitting diode array having at least one laser emitting diode.

3. The device according to claim 1, further comprising at least one electro-optical signal converter allocated to the at least one emitter and configured to convert a data signal into a corresponding electromagnetic signal to be sent by the at least one emitter.

4. The device according to claim 1 further comprising at least one multiplexer unit allocated to the at least one emitter and configured to multiplex multiple signals to be sent by the at least one emitter.

5. The device according to claim 1, further comprising at least one demultiplexer unit allocated to the at least one receiver and configured to separate multiple bundled signals received by the at least one receiver as an electromagnetic signal.

6. The device according to claim 1, further comprising at least one electro-optical signal converter allocated to the at least one receiver and configured to convert an electromagnetic signal received by the at least one receiver into a corresponding data signal.

7. The device according to claim 6, wherein the electro-optical signal converter includes a signal/data interface via which the electro-optical signal converter is connected to a data bus.

8. The device according to claim 1, wherein the lamp module includes at least one main beam headlight or at least one signal light.

9. The device according to claim 8, wherein the at least one main beam headlight or the at least one signal light is at least partially formed by an LED array.

10. The device according to claim 8, wherein the lamp module is part of an exterior light assembly or is formed as an exterior light assembly.

11. The device according to claim 1, wherein the at least one emitter includes a light-emitting diode array having at least one light-emitting diode.

12. The device according to claim 11, wherein the at least one light-emitting diode is part of an LED array of a light module of the lamp module.

13. The device according to claim 1, wherein the at least one receiver includes an assembly having at least one photodiode or at least one PIN-photodiode.

14. The device according to claim 13, wherein the at least one photodiode or the at least one PIN-photodiode is implemented in an LED array of a light module of the lamp module.

15. A lamp module comprising:
a receiver, configured to receive at least a portion of electromagnetic radiation emitted by an emitter and convert the received electromagnet radiation into a data signal, wherein the lamp module is configured to be installed in a front region of a vehicle of a multi-membered track-guided vehicle combination; and
wherein a distance to an object adjacent to the emitter is determined based on the at least the portion of the electromagnetic radiation received by the at least one receiver, and wherein the object is closer to the at least one emitter than to the at least one receiver.

16. The lamp module according to claim 15, wherein the at least one receiver includes an assembly having at least one photodiode or at least one PIN-photodiode.

17. The lamp module according to claim 16, wherein the at least one photodiode or the at least one PIN-photodiode is implemented in an LED array of a light module of the lamp module.

18. The lamp module according to claim 15, wherein the emitter is part of a different lamp module.

* * * * *